US007889085B2

(12) United States Patent
Downey et al.

(10) Patent No.: US 7,889,085 B2
(45) Date of Patent: Feb. 15, 2011

(54) SWIM WATCH

(75) Inventors: David J. Downey, Louisburg, KS (US);
Kristin M. Massoth, Prairie Village, KS (US)

(73) Assignee: Garmin Switzerland GmbH (CH)

( * ) Notice: Subject to any disclaimer, the term of this patent is extended or adjusted under 35 U.S.C. 154(b) by 334 days.

(21) Appl. No.: 12/129,399

(22) Filed: May 29, 2008

(65) Prior Publication Data

US 2009/0295596 A1     Dec. 3, 2009

(51) Int. Cl.
*G08B 23/00*     (2006.01)
(52) U.S. Cl. ............... 340/573.1; 340/850; 340/539.13; 701/213; 368/108
(58) Field of Classification Search ............. 340/573.1, 340/850, 573.6, 693.5, 539.13; 368/108, 368/109; 701/213, 25, 207; 702/182
See application file for complete search history.

(56) References Cited

U.S. PATENT DOCUMENTS

| 5,685,722 | A | | 11/1997 | Taba ........................... 434/254 |
| 5,871,406 | A | * | 2/1999 | Worrell ....................... 473/221 |
| 6,002,982 | A | | 12/1999 | Fry ............................. 701/213 |
| 6,144,620 | A | * | 11/2000 | dePoortere ................... 368/108 |
| 6,837,827 | B1 | | 1/2005 | Lee et al. ........................ 482/8 |
| 6,853,955 | B1 | | 2/2005 | Burrell et al. ............... 702/182 |
| 7,310,063 | B1 | | 12/2007 | Brown ................... 342/357.06 |
| 2008/0018532 | A1 | | 1/2008 | Mackintosh et al. ... 342/357.12 |
| 2008/0046179 | A1 | | 2/2008 | Mackintosh et al. ........ 701/213 |

FOREIGN PATENT DOCUMENTS

WO     WO 2004/005953     1/2004

OTHER PUBLICATIONS

European Search Report from corresponding European Patent Application No. EP 09006093, dated Mar. 1, 2010.
U.S. Appl. No. 11/681,032, entitled Method and Apparatus for Estimating a Motion Parameter filed Mar. 1, 2007.

* cited by examiner

*Primary Examiner*—Anh V La
(74) *Attorney, Agent, or Firm*—Samuel M. Korte

(57) ABSTRACT

A watch device for use by a swimmer while swimming in a body of water. The watch device may generally comprise a housing, a location determining component disposed within the housing and operable to receive one or more satellite signals to determine a current geographic location of the housing, and a processing system. The processing system may synchronize the location determining component with the swimmer's arm movement so that the location determining component can determine the current geographic location of the housing.

25 Claims, 5 Drawing Sheets

SWIM WATCH

BACKGROUND

Embodiments of the present invention are directed to methods and apparatuses for monitoring the performance of a swimmer. More particularly, various embodiments of the invention provide a swim watch operable to generate accurate location-based information for a swimmer.

GPS-based fitness products, such as the popular Garmin® Forerunner® line of products and other wrist-worn GPS-based personal trainers, are increasingly used by athletes and other exercising individuals to generate performance and/or other location-based information utilizing the Global Position System (GPS). These fitness products can provide excellent functionality even when embodied as slender wristwatches. However, GPS signals do not penetrate water to any meaningful depth. Consequently, GPS-based fitness products may have difficulty receiving satellite navigation signals while underwater, thereby limiting their use in water-related activities such as swimming.

SUMMARY

Embodiments of the present invention provide a watch device for use by a swimmer while swimming in a body of water. The watch device may generally comprise a housing, a location determining component disposed within the housing and operable to receive one or more signals to determine a current geographic location of the housing, and a processing system. The processing system may be operable to synchronize the location determining component with the swimmer's arm movement so that the location determining component is operable to determine the current geographic location of the housing.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are exemplary and explanatory only and are not necessarily restrictive of the invention claimed. The accompanying drawings, which are incorporated in and constitute a part of the specification, illustrate embodiments of the invention and together with the Detailed Description, serve to explain the principles of the invention.

BRIEF DESCRIPTION OF THE DRAWING FIGURES

Embodiments of the present invention are described in detail below with reference to the attached drawing figures, wherein.

Figure 1:
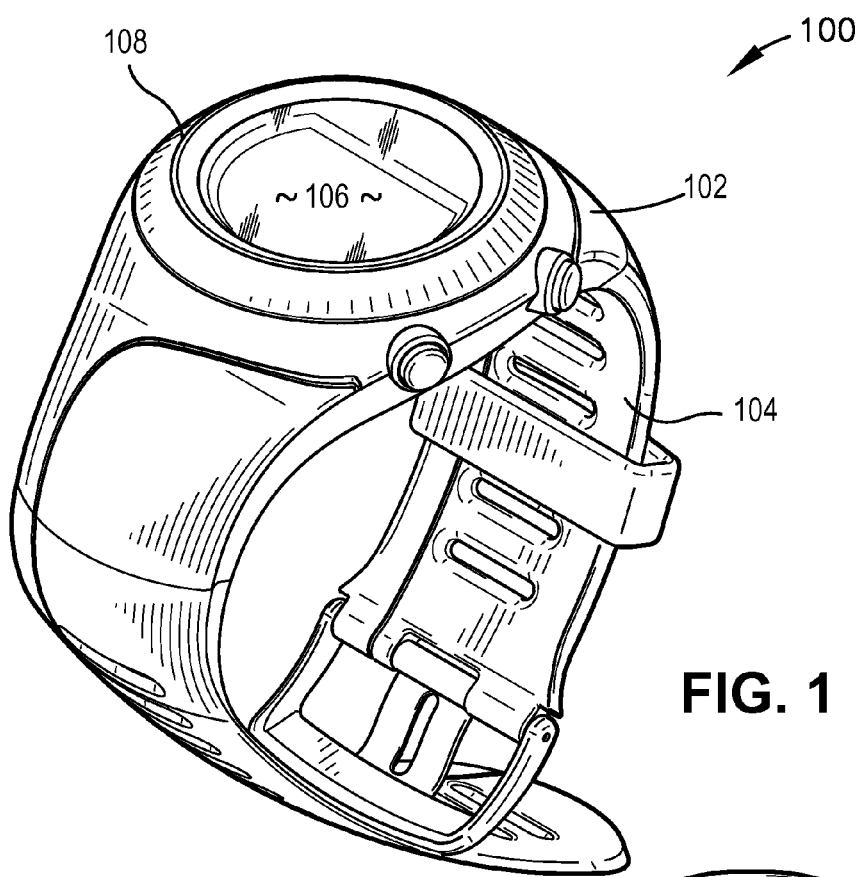
FIG. 1 is an isometric view illustrating a watch device constructed in accordance with various exemplary embodiments of the present invention.
Figure 2:
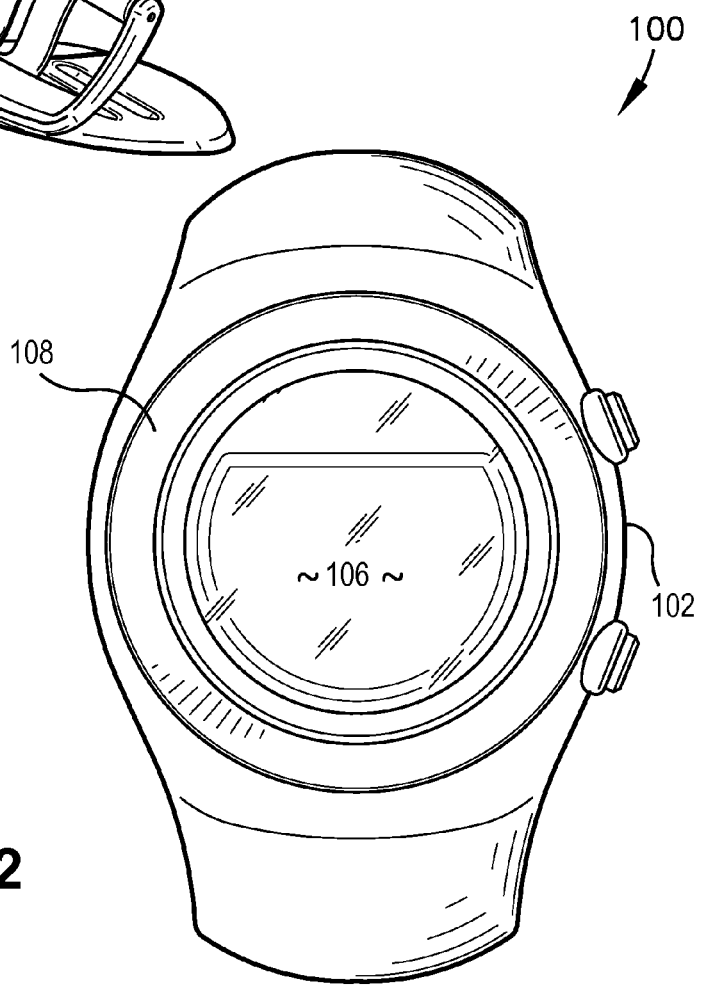
FIG. 2 is a top plan view of the watch device shown in FIG. 1.
Figure 3:
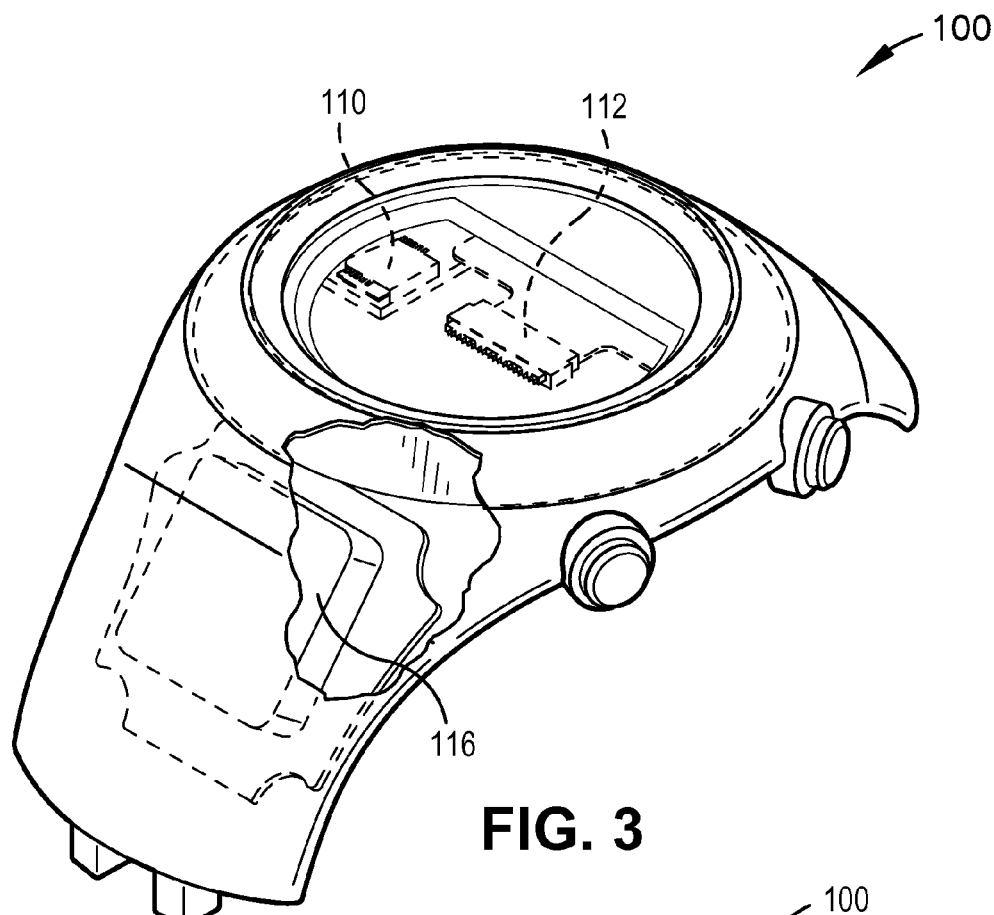
FIG. 3 is an isometric view of the watch device shown in FIG. 1, having sections cut away for further illustrating internal components of the watch device.
Figure 4:
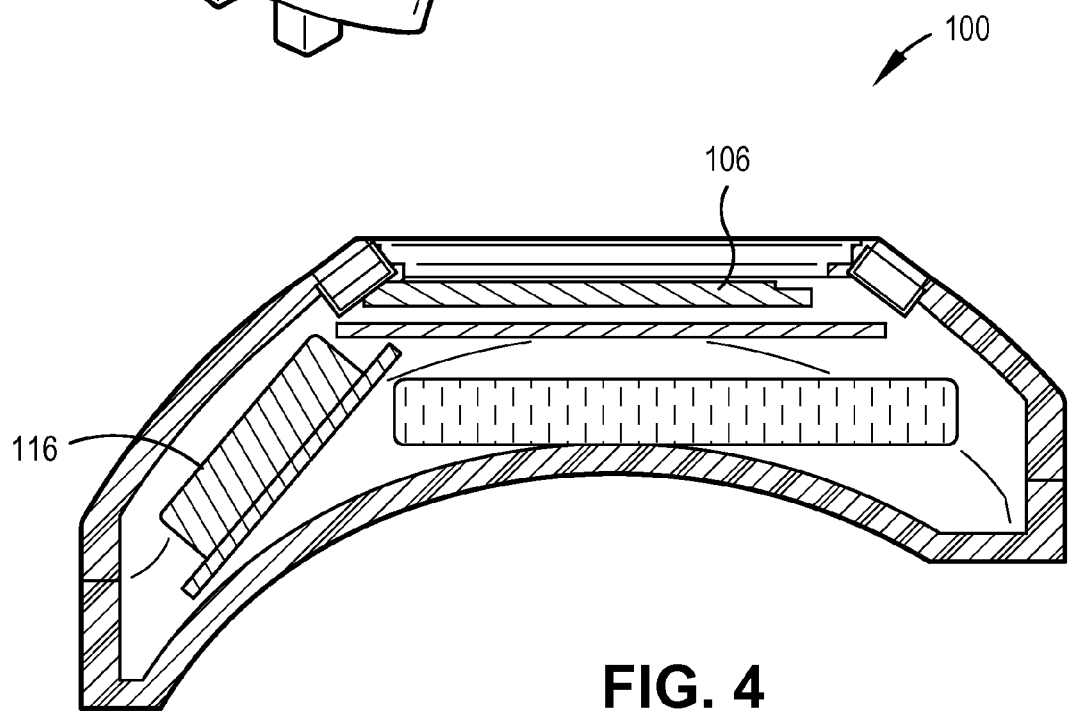
FIG. 4 is a diagrammatic cross-sectional side elevational view taken through the housing of the watch device shown in FIG. 1, further illustrating the internal components of the watch device.
Figure 5:
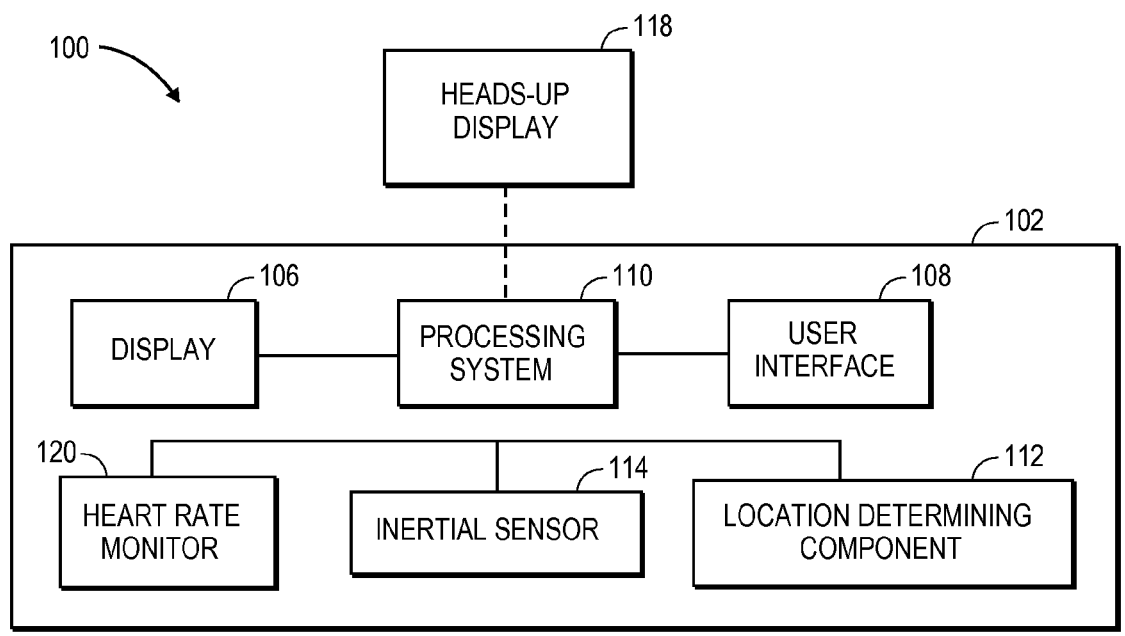
FIG. 5 is a block diagram showing various components of the watch device of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION

The detailed description is described with reference to the accompanying figures. The use of the same reference numbers in different instances in the description and the figures may indicate similar or identical items.

Referring generally to FIGS. 1 through 5, a watch device 100 constructed in accordance with embodiments of the present invention is described. In various embodiments, the watch device 100 is operable to accurately receive satellite navigation signals by synchronizing the receipt of the satellite navigation signals. The watch device 100 can also generate track logs and performance information for feedback to a user while swimming.

The watch device 100 includes a housing 102 shaped to be worn on the arm of the user (and typically on the back of the wrist of the user) which is coupled to the user's wrist via a wristband 104. In some embodiments, the wristband 104 may form an integral part of the housing 102. The housing 102 generally includes a bottom surface, which may be shaped to fit against the user's wrist and a top surface generally facing away from the bottom surface and wrist. In some embodiments, the housing 102 may be waterproof, such as by complying with the IEC 529 IPX8 standard or any other waterproof standard suitable for protection during swimming.

A display 106 is disposed in the housing 102 so that it may be viewed by the user of the watch device 100 while the watch device 100 is worn on the wrist of the user. The display 106 can display data and information as described herein. The display 106 may comprise an LCD (Liquid Crystal Display), TFT (Thin Film Transistor) LED (Light Emitting Diode), LEP (Light Emitting Polymer) and/or PLED (Polymer Light Emitting Diode), or the like, capable of displaying text and graphical information. The display 106 may be backlit via a backlight such that it may be viewed in the dark or other low-light environments.

In exemplary embodiments, the display 106 may include a generally transparent lens crystal for covering and protecting the internal electronic components (e.g., LCD, LED, PLED, circuit board, etc.) of the display 106. The bezel, crystal, and housing 102 and the joints or connections there between may be made substantially waterproof or water-resistant to prevent the intrusion of liquids and other foreign objects within the housing 102.

In the embodiment illustrated, the display 106 is surrounded by a touch sensitive user interface 108. The user interface 108 includes a generally ring-shaped bezel which aesthetically unites the display 106 to the top surface of the housing 102. The bezel may be formed of metal or plastic and, in specific implementation may be joined to the housing in a water-resistant or water-proof manner as discussed above to prevent the intrusion of fluids into the housing 102. The user interface 108 may also include other elements to communicate with the user, such as a speaker to generate sounds for hearing by the user, a microphone to receive sounds from the user, and a vibrating element to vibrate or rumble the housing 102 for communication with the user while swimming.

In embodiments, the watch device 100 may further include one or more mechanical buttons disposed adjacent to the bezel in the housing 102. In exemplary embodiments, the mechanical buttons may be used to control commonly used function of the watch device 100. For example, in one specific embodiment wherein the watch device comprises a swim watch, the buttons may be used to control functions that are most commonly used while swimming (e.g. start/stop for a timer or stopwatch, enter, lap/reset, quit, etc.). In embodiments, the combination of mechanical buttons and the touch sensitive user interface 108 enhances the functionality, flexibility and reliability of the watch device 100. For example, in one specific embodiment, the touch sensitive user interface 108 may be used to scroll menus for display by the display 106 while the mechanical buttons may be used to select items within the menus.

However, in some embodiments, the user interface 108 is not necessarily touch-sensitive. For example, in swimming configurations, a touch-sensitive user interface 108 may be difficult for a swimmer to properly use. Thus, the user interface 108 may be comprised solely of the mechanical buttons discussed above or other inputs that may be easily used in water environments.

The watch device 100 may include one or more printed circuit boards which may support a processing system 110, a location determining component 112, a memory, an inertial sensor 114, wireless transmission components (e.g., cellular, BLUETOOTH™, ANT™, IEEE 802.11 (Wi-Fi), etc.), and the like. The housing 102 may also enclose an antenna assembly 116 for the location determining component 112. A battery provides electrical power to operate the watch device 100. The housing 102 can enclose and protect these internal components from environmental contaminants, moisture, vibration, impact, and the like.

The processing system 110 may include any number of processors, controllers, or other processing elements and resident or external memory for storing data and other information accessed and/or generated by the watch device 100. The processing system can implement one or more software programs which control the display of information on the display 106 and input of information via the user interface 108 and/or mechanical buttons. The processing system 110 may include microprocessors, microcontrollers, programmable intelligent computers (PICs), field-programmable gate arrays (FPGAs) or other programmable logic devices (PLDs), fully-custom or semi-custom application-specific integrated circuits (ASICs), any device that is described by one or more code segments of a hardware description language (HDL), combinations thereof, and the like.

In exemplary embodiments, the location determining component 112 comprises a global positioning system (GPS) receiver. The location determining component 112 may additionally or alternatively be a receiver suitable for use with another Global Navigation Satellite system (GNSS) or any other device which can determine locations of the watch device 100, including cellular telephone receivers and terrestrial navigation radio receivers. Where a GPS receiver is employed as the location determining component 112, the GPS receiver may be operable to receive navigational signals from GPS satellites to calculate a position of the watch device 100 as a function of the signals. In exemplary embodiments, the location determining component 112 may also be operable to calculate a route to a desired location, provide instructions to navigate to the desired location, display maps and other information on the display 106, and to execute other functions described herein. In some embodiments, the location determining component The location determining component 112 may include one or more processors, controllers, or other processing systems and memory or may utilize the components of the processing system 110. In some embodiments, the processing system 110 may be integral with the location determining component 112. In exemplary embodiments, the memory of the processing system 110 and/or the location determining component 112 may store cartographic data and routing used by or generated by the location determining component 112. The memory may be integral with the location determining component 112, integral with the processing system 110, stand-alone memory, or a combination thereof. The memory may include, for example, removable and non-removable memory elements such as RAM, ROM, flash and/or other conventional memory elements.

The antenna assembly 116 is configured and strategically mounted and positioned to optimize reception of external radio frequency signals (e.g., transmitted from the GPS satellites while minimizing the overall size of the watch device 100 and eliminating protrusions from the housing 102 of the device 100). In the embodiment illustrated, the antenna assembly 116 comprises a patch antenna. However, other antenna types and configurations, such as linear chip and pulse antennas, may be used without departing from the scope and intent of the present invention.

The inertial sensor 114 may include one or more sensors operable to detect movement of the housing 102. In some embodiments, the inertial sensor 114 may comprise one or more single or multi-axis accelerometers operable to detect acceleration along one, two, and/or three axes of movement utilizing micro electro-mechanical system (MEMS) components or other suitable methods. Additionally or alternatively, the inertial sensor 114 may comprise inclinometers, tiltmeters, gyroscopes, compasses, magnetic field sensors, mechanical switches, combinations thereof, and the like.

Figure 6:
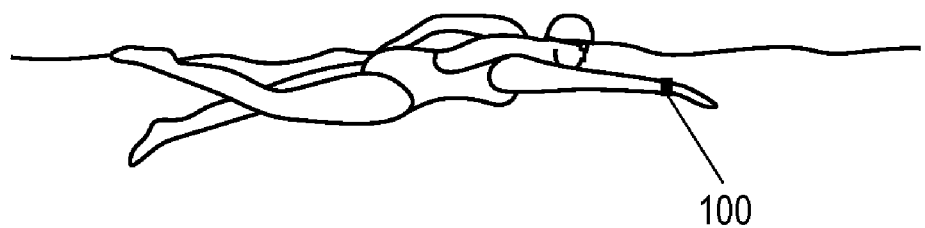
FIG. 6 is an environmental view showing a swimmer in a first position.
Figure 7:
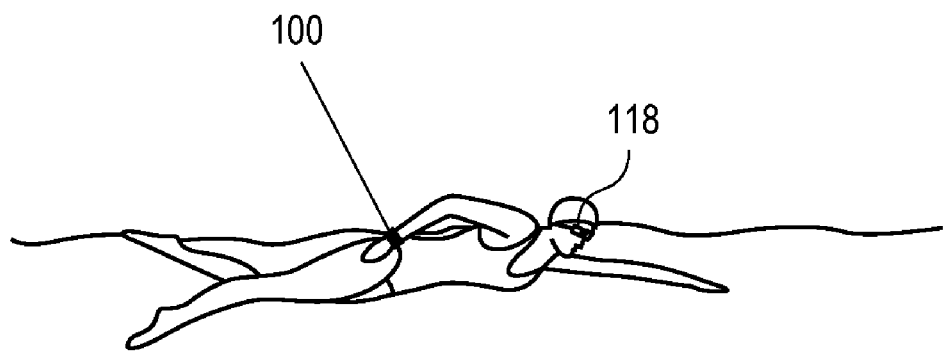
FIG. 7 is an environmental view showing a swimmer in a second position.
Figure 8:
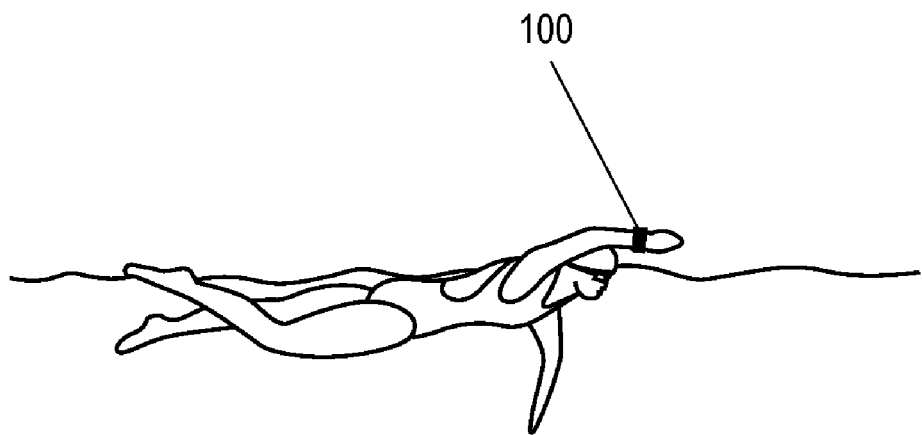
FIG. 8 is an environmental view showing a swimmer in a third position.

In some embodiments, the watch device 100 may comprise or otherwise be coupled with a heads-up display 118 for use by the user while swimming. The heads-up display 118 may be incorporated into swim goggles, as is illustrated in FIGS. 6 through 8, and/or be otherwise positioned for viewing by the user while swimming with minimal or no impact on the user's stroke. For example, the heads-up display 118 may be integrated in a swim cap or a display mounted externally to the user, such as a display positioned on the sides or walls of a swimming pool. The heads-up display 118 may comprise various display elements, such as an LCD (Liquid Crystal Display), TFT (Thin Film Transistor), LEP (Light Emitting Polymer), PLED (Polymer Light Emitting Diode), cathode-ray tube (CRT), projection systems, combinations thereof, and/or the like, capable of displaying text and graphical information. In some configurations, the heads-up display 118 may be a simple lighting display that indicates a desired route correction, as is discussed in more detail below. For example, the heads-up display 118 may include two or three light emitting diodes (LED) to provide directional information to the user and/or a swim cap including earphones that can emit sound in either of the user's ears.

In some embodiments, the watch device 100 may comprise or otherwise be coupled with a heart-rate monitor (HRM) 120. The HRM 120 is operable to monitor the user's heart rate, such as by employing one or more electrodes or other sensors to monitor electrical voltages in the user's heart or the flow of blood from the user's heart. The HRM 120 may be separate form the housing 102, such as where the HRM 120 is adapted for wearing around the user's torso. In such configurations, the HRM 120 may wirelessly transmit heart rate information to the processing system 110, such as by using wirelessly protocols such as Wi-Fi, Bluetooth, ANT or other radio-frequency, sonic, or infrared methods. Additionally or alternatively, the HRM 120 may be disposed within the housing 102 of the watch device 100 to sense the user's heart rate without requiring the use of external monitors.

In operation, the watch device 100 may determine its current geographic location utilizing the location determining component 112. In some embodiments, the location determining component 112 may function in a substantially conventional manner to determine the current geographic location of the watch device 100. However, the processing system 110 can be adapted to synchronize operation of the location determining component 112 with the user's arm movement based on movement sensed by the inertial sensor 114.

For example, due to the inability of GPS signals to penetrate water to a meaningful depth, the location determining component 112 may have difficulty receiving satellite navigation signals while the watch device 100 is submerged during the user's swimming activities. By using the movement sensed by the inertial sensor 114, the processing system 110 can synchronize the location determining component 112 to improve, or even maximize, its ability to receive satellite navigation signals.

Referring to FIGS. 6 through 8, exemplary swim positions for the user while swimming free-style (front crawl) are illustrated. In the first position of FIG. 6, the user's right arm, bearing the watch device 100, is underwater. In the second position of FIG. 7, the user's right arm is moving reward and upward to breach the surface of the water. In the third position of FIG. 8, the user's right arm is out of the water.

The inertial sensor 114 may detect movement of the watch device 100 and therefore movement of the user's right arm. For example, the inertial sensor 114 may generate acceleration signals that may be analyzed by the inertial sensor 114 itself and/or by the processing system 110 to identify acceleration signatures generally unique to each part of the user's swimming stroke. Thus, for instance, the acceleration signature occurring from movement from the first position of FIG. 6 to the second position of FIG. 7 will be generally rearward. The acceleration signature occurring from movement from the second position of FIG. 7 to the third position of FIG. 8 will be generally upward. The acceleration signature occurring from movement from the third position of FIG. 8 to the first position of FIG. 6 will be generally downward. By identifying these acceleration signatures, the processing system 110 may synchronize the location determining component 112 to be functional when it is in the best position to receive satellite navigation signals—e.g., when the watch device 100 is out of the water. As should be appreciated, the position of the user's arm may be determined by employing the inertial sensor 114 in any configuration and embodiments of the present invention are not limited to determining arm position based on acceleration signatures corresponding to user arm positions. For example, the processing system 110 and/or inertial sensor 114 may be adapted to identify when the watch device 100 impacts the surface of the water and/or other user positions and movements, such as wrist rotation, may be identified by using the inertial sensor 114.

The processing system 110 and inertial sensor 114 may also be adapted to identify stroke and location information for strokes other than the front crawl illustrated in FIGS. 6 through 8. For example, the watch device 100 may present various stroke modes, such as front crawl (freestyle), breaststroke, butterfly, backstroke, side stroke, combinations thereof, and the like. In some embodiments, the user may function the user interface 108 to indicate which stroke he or she will be using. In other embodiments, the processing system 110 may automatically identify the stroke used by employing information provided by the inertial sensor 114, such as acceleration signatures corresponding to the various strokes identified above. By utilizing information corresponding to the stroke actually performed by the user, the processing system 110 can accurately synchronize the location determining component 112.

The processing system 110 may synchronize the location determining component 112 utilizing various functions or combinations of functions. For example, each time the processing system 110 determines that the user's arm is, or is about to be, above the water, the processing system 110 may send a signal to the location determining component 112 to cause the location determining component 112 to acquire a satellite navigation signal. The signal provided by the processing system 110 may be an activation signal that powers the location determining component 112 and/or an activation signal that awakens the location determining component 112 from a sleep mode. For instance, the location determining component 112 may acquire (fix) a satellite navigation signal only in response to the activation signal provided by the processing system 110 such that the location determining component 112 does not acquire satellite navigation signals when the watch device 100 is underwater (i.e., when the activation signals are not being sent by the processing system 110).

The time required by the location determining component 112 to acquire a satellite navigation signals varies based on the configuration of the location determining component 112. In configurations where the location determining component 112 has valid and current time, position, almanac, and ephemeris data available, the time to first fix (TTFF) for each activation of the location determining component 112 may be substantially less than one second. However, in other configurations, it the TTFF may not be substantially less than one second.

Thus, in some embodiments, it may be desirable for the processing system 110 to synchronize the location determining component 112 by generating a stroke model for the user and a timing signal corresponding to the stroke model. The stroke model may be generated using the inertial sensor 114 and/or by using information corresponding to the location determining component 112. For example, utilizing information provided by the inertial sensor 114, the processing system 110 may generate a stroke model representing the predicted or expected duration the user's arm will be in various positions during each stroke and provide a corresponding timing signal to the location determining component 112. Further, the processing system 110 may generate the stroke model based on a signal acquisition history of the location determining component 112, such as by identifying that the location determining component 112 is functional (i.e., above water) every 1.5 seconds, without requiring the use of the inertial sensor 114.

The stroke model may also indicate a static or dynamic time period at which the location determining component 112 should acquire satellite signals—e.g., every 1.5 seconds. The timing signal may also indicate, in advance, a period or other time interval at which the location determining component 112 should acquire satellite navigation signals to maximize the signal reception abilities of the watch device 100. The location determining component 112 may utilize the timing signal provided by the processing system 110 to begin the signal acquisition process even before the watch device 100 is raised out of the water (e.g., such as by seeking a satellite navigation signal fix in the second position of FIG. 7) at a fixed or dynamic period corresponding to the stroke model.

Synchronization of the location determining component 112 enables the watch device 100 to at least periodically determine its current geographic location utilizing one or more received satellite navigation signals. Determined geographic locations may be presented to the user on the display 106, the heads-up display 118, and/or stored within the memory for later use by the processing system 110 or other devices.

The watch device 100 may function in various operating modes, such as an exercise mode that calculates exercise-related information for the user based on the locations determined by the location determining component 112, a navigation mode that calculates navigation routes and other information using locations determined by the location determining component 112, a calendar mode operable to store and indicate scheduled events such as races and exercise schedules, and a watch mode that may provide basic time-keeping functionality such as the time of day, the date, the year, alarms, and the like. In some embodiments, the exercise mode may provide the performance-monitoring functionality disclosed in U.S. Pat. Nos. 6,837,827, 7,085,678, and 7,057,551 (each of which are incorporated herein by reference) and/or that employed by the Garmin® Forerunner® line of products. As should be appreciated, the watch device 100 may present any number of operating modes and it is not limited to using the exemplary modes discussed above.

For example, in the exercise mode, the watch device 100 may provide various swim-related information, such as current and average speed, pace, stroke count, distance traveled, lap count, energy expended, goal and target information, virtual partner information, combinations thereof, and the like. The watch device 100 may also provide information associated with the HRM 120, such as current heart rate, energy expended, goal and target heart rate information, combinations thereof, and the like. The performance-related information generated by the watch device 100 may be presented on the display 106, the heads-up display 118, and/or stored within the memory for later use by the watch device 100 or other systems and devices.

In some embodiments, the exercise mode may provide metronome functionality to help the user swim at a certain rate or pace. For example, the user may input a desired stroke rate into the user interface 108 and/or the processing system 110 may calculate a desired stroke rate based on performance related information, and the display 106 and/or heads-up display 118 may flash each time a stroke is to be performed. Additionally or alternatively, the user interface 108 may generate audible sound using the speaker and/or vibration/movement using the vibrating element to indicate that a stroke is to be performed. The metronome functionality may additionally or alternatively indicate to the user a desired increase or decrease in swim rate. For example, if the user should swim faster, the user interface 108 may generate sound, visuals, and/or vibrations to instruct the user to increase stroke rate. Similarly, the user interface 108 may generate sound, visuals, and/or vibrations to instruct the user to decrease stroke rate.

In some embodiments, the watch device 100 may also function in a triathlon mode to provide performance-related and location-based information for running, swimming, and biking. The user may manually indicate the current stage of the triathlon and/or the processing system 110 may automatically detect whether the user is running, swimming, or biking, such as by identifying acceleration signatures corresponding to each of the activities and/or by using location-based information and map data, such as the current position of the user, to determine the activity in which the user is currently engaged.

Figure 9:
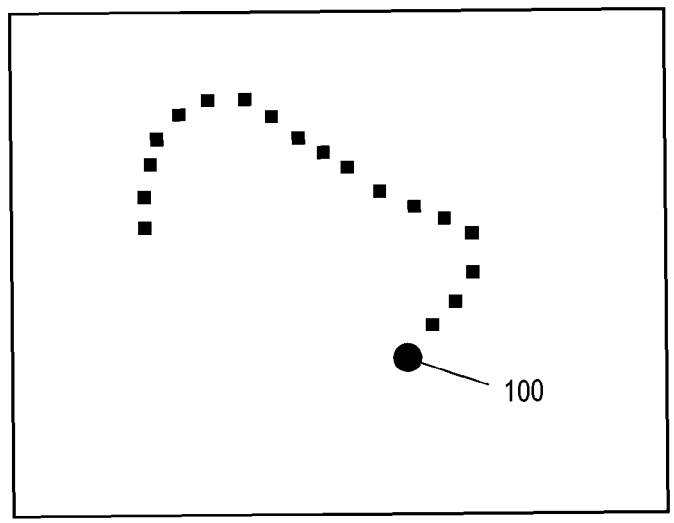
FIG. 9 is a first exemplary track log operable to be generated by various embodiments of the present invention.
Figure 10:
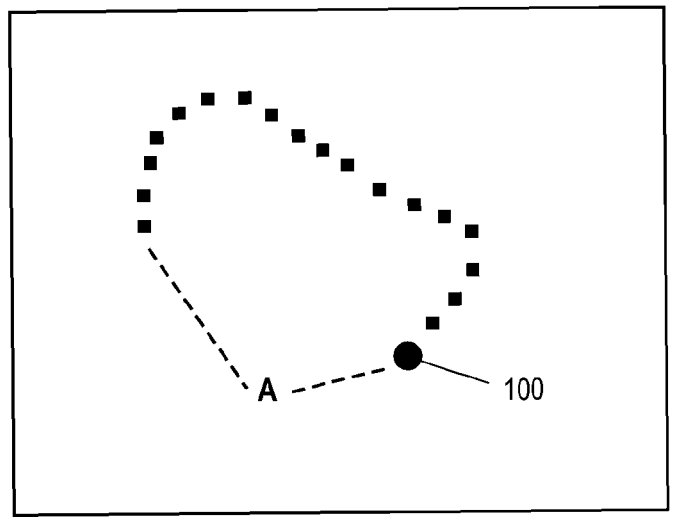
FIG. 10 is a second exemplary track log operable to be generated by various embodiments of the present invention.
Figure 11:
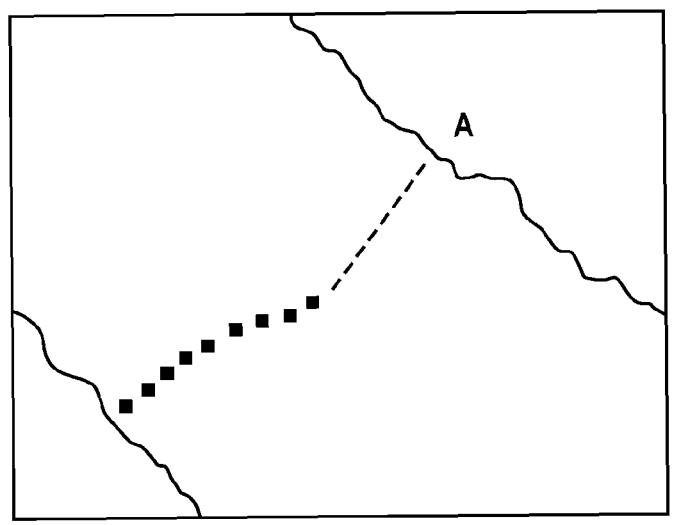
FIG. 11 is a third exemplary track log operable to be generated by various embodiments of the present invention.

In some embodiments, as illustrated in FIGS. 9 through 11, the processing system 110 may generate a track log representing various locations of the watch device 100. Even if the location determining component 112 is only periodically operable to determine the location of the watch device 100 due to the synchronization discussed above, the generated track log may display these intermittent locations in a manner that is still beneficial to the user. For example, the user may use a track log representing the current and previous locations of the watch device 100 to determine where to swim to complete a lap and also to perform basic navigation functions, such as how to return to the user's starting point. As discussed below and as illustrated in FIGS. 10-11, the processing system 110 may also perform route calculation and deviation analysis and provide an indication of the route within the track log. The track log(s) generated by the processing system 110 may be presented on the display 106 and/or heads-up display 118 in real-time and/or stored within the memory for later use and access.

The processing system 110 may identify a route, such as a desired travel path, for the user and determine when the user deviates from the identified route. In some embodiments, the user may input a desired route, such as a desired starting and ending location, using the user interface 108. Additionally or alternatively, the processing system 110 may calculate the route based on information provided by the user, such as a starting location, ending location, waypoints, total distance, total laps, total time, lap distance, total distance, combinations thereof, and the like.

The processing system 110 may automatically identify a route based on the user's current location and bearing. For example, if the user desires to swim across a body of water from one shore to another, or from one end of a pool to another, the user may function the user interface 108 and the processing system 110 can use the current location and bearing of the watch device 100 to calculate a route to the other shore or to the other end of the pool.

The processing system 110 can compare the current geographic location of the watch device 100, and/or previous locations of the watch device 100, to the identified route to determine if the user has deviated from the route. For example, the user may have difficulty swimming in a straight line due to water currents as shown in FIG. 11 or swimming in a circular or irregular pattern as shown in FIG. 10. If the processing system 110 determines that the user has deviated from the route, the processing system 110 may identify a desired correction to place the user back on the identified route. For example, the processing system 110 may determine the user has veered to the right of the original route (FIG. 11) and calculate a correction (such as swim left) for display to the user to place the user on his or her desired route.

The desired correction, such as an indication to swim right or left, may be presented to the user on the display 106 and/or on the heads-up display 118 so that the user may make the desired correction. In some embodiments, the correction indication may be audibly presented to the user by the watch device 100, such as by generating a certain sound or by generating a certain sound in a selected one of the user's ears (e.g., generate sound in the user's right ear to prompt the user to swim to the right). In some embodiments, the user interface 108 may include the vibrating element, such as a piezoelectric motor, to vibrate the housing 102 to indicate a route correction to the user (e.g., vibrate once to swim to the right and vibrate twice to swim to the left).

As discussed above, in some embodiments, the HRM 120 may wirelessly provide heart rate information to the processing system 110 for analysis and processing. To prevent data loss and the inhibition of real-time performance monitoring, the HRM 120 may cache heart rate data in a local memory in the event of transmission failure to the processing system 110. For example, the position of the user while swimming and the water between the HRM 120 and processing system 110 may prevent or limit the ability of the HRM 120 to wirelessly communicate with the processing system 110. The HRM 120 may continuously cache heart rate information or cache heart rate information only if the processing system 110 does not confirm reception of transmitted information. The HRM 120 may cache any duration of heart rate information for use by the processing system 110 once transmission is resumed. The cached heart rate information may be time stamped to enable the processing system 110 to identify the user's heart rate at a given time. Once transmission to the processing system 110 is resumed, the HRM 120 can transmit the cached heart rate information, including the information which was not received by the processing system 110, and current heart rate information to the processing system 110.

After receiving cached heart rate information from the HRM 120, the processing system 110 may backfill the cached heart rate information to limit the impact of the transmission failure on the exercise and performance-related functions being provided to the user. For example, the processing system 110 can update and/or recalculate various performance-related metrics, such as energy expended, average heart rate, and the like, as if the transmission failure never occurred. Thus, the transparent merging of the cached heart rate information with previous and current heart rate information provides an appearance that the processing system 110 has been continuously receiving heart rate information. In some embodiments, the caching and backfilling discussed above is not limited to heart rate information and may apply to any information wirelessly received by the watch device 100, including satellite navigation signals and communication signals.

Although the invention has been described with reference to exemplary embodiments illustrated in the attached drawing figures, it is noted that equivalents may be employed and substitutions made herein without departing from the scope of the invention as recited in the claims. Further, the watch device 100 and its components illustrated and described herein are merely examples of a device and components that may be used to implement the present invention and may be replaced with other devices and components without departing from the scope of the present invention.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A watch device for use by a swimmer while swimming in a body of water, the watch device comprising:
    a housing;
    a location determining component disposed within the housing and operable to receive one or more signals to determine a current geographic location of the housing; and
    a processing system disposed within the housing and coupled with the location determining component, the processing system operable to synchronize the location determining component with the swimmer's arm movement so that the location determining component is operable to determine the current geographic location of the housing.

2. The watch device of claim 1, wherein the location determining component comprises a global positioning system (GPS) receiver and an antenna.

3. The watch device of claim 1, further including an inertial sensor disposed within the housing and operable to sense movement of the housing, the processing system being operable to synchronize the location determining component with the swimmer's arm movement based on the movement sensed by the inertial sensor.

4. The watch device of claim 1, wherein the processing system is operable to synchronize the location determining component by activating the location determining component when the swimmer's arm is out of the water.

5. The watch device of claim 1, wherein the processing system is operable to synchronize the location determining component by waking the location determining component from a sleep mode.

6. The watch device of claim 1, wherein the processing system is operable to synchronize the location determining component by providing a timing signal to the location determining component.

7. The watch device of claim 1, wherein the processing system is operable to synchronize the location determining component with upward movement of the swimmer's arm.

8. The watch device of claim 1, wherein the processing system is operable to generate performance information for the swimmer based on locations determined by the location determining component.

9. The watch device of claim 1, wherein the processing system is operable to determine a route deviation for the swimmer based on locations determined by the location determining component.

10. The watch device of claim 9, further including a display disposed within the housing and coupled with the processing system, the display operable to present an indication of the route deviation.

11. The watch device of claim 9, further including a heads-up display operable to wirelessly communicate with the processing system to present an indication of the route deviation.

12. A watch device for use by a swimmer while swimming in a body of water, the watch device comprising:
    a waterproof housing;
    a display;
    a location determining component disposed within the housing and operable to receive one or more satellite signals to determine a current geographic location of the housing;
    an inertial sensor disposed within the housing and operable to sense movement of the housing; and a processing system disposed within the housing and coupled with the location determining component and the inertial sensor, the processing system operable to— synchronize the location determining component with the swimmer's arm movement based on the movement sensed by the inertial sensor so that the location determining component is operable to determine the current geographic location of the housing, generate a track log based on locations determined by the location determining component, generate performance information for the swimmer using information selected from the group consisting of locations determined by the location determining component, movement sensed by the inertial sensor, and combinations thereof, and control the display to present an indication of the generated track log and performance information.

13. The watch device of claim 12, wherein the location determining component comprises a global positioning system (GPS) receiver and an antenna.

14. The watch device of claim 12, wherein the inertial sensor comprises one or more accelerometers.

15. The watch device of claim 12, wherein the processing system is operable to synchronize the location determining component by activating the location determining component when the swimmer's arm is out of the water.

16. The watch device of claim 12, wherein the processing system is operable to synchronize the location determining component by waking the location determining component from a sleep mode.

17. The watch device of claim 12, wherein the processing system is operable to synchronize the location determining component by providing a timing signal to the location determining component.

18. The watch device of claim 12, wherein the processing system is operable to synchronize the location determining with upward movement of the swimmer's arm.

19. The watch device of claim 12, wherein the processing system is operable to determine a route deviation for the swimmer based on locations determined by the location determining component and control the display to present a visual indication of the route deviation.

20. The watch device of claim 12, wherein the display is disposed within the housing.

21. A method for synchronizing a location determining component housed within a watch device worn by a swimmer while swimming in body of water, the method comprising:

sensing movement of the watch device using an inertial sensor; and synchronizing the location determining component with the swimmer's arm movement based on the movement sensed by the inertial sensor so that the location determining component is operable to determine the current geographic location of the watch device.

22. The method of claim 21, wherein the location determining component is synchronized by activating the location determining component when the swimmer's arm is out of the water.

23. The method of claim 21, wherein the location determining component is synchronized by waking the location determining component from a sleep mode.

24. The method of claim 21, wherein the location determining component is synchronized by providing a timing signal to the location determining component.

25. The method of claim 21, wherein the location determining component is synchronized with upward movement of the swimmer's arm.

* * * * *